United States Patent
Wu (10) Patent No.: US 6,834,734 B2
(45) Date of Patent: Dec. 28, 2004

(54) DEVICE FOR COMPENSATING DIRECTIONAL OFFSET OF ELECTRICAL SCOOTER

(76) Inventor: Donald P. H. Wu, No. 169, Ken Tzu Ku, Shang Ken Tsun, Hsin Feng Hsiang, Hsinchu County (TW)

( * ) Notice: Subject to any disclaimer, the term of this patent is extended or adjusted under 35 U.S.C. 154(b) by 0 days.

(21) Appl. No.: 10/274,333

(22) Filed: Oct. 17, 2002

(65) Prior Publication Data

US 2004/0074683 A1 Apr. 22, 2004

(51) Int. Cl.$^7$ .................. B60K 1/00; B62D 61/06; B62D 7/22; B62K 1/00; B62M 1/00
(52) U.S. Cl. ............ 180/65.5; 180/214; 180/907; 280/272; 280/89.11; 280/87.042
(58) Field of Search ................ 180/65.5, 219, 180/907, 908, 210, 211, 213, 214, 13; 280/87.01, 87.041, 87.042, 87.05, DIG. 5, 62, 63, 89.11, 93.501, 271, 272; 16/35 R, 35 D, 44

(56) References Cited

U.S. PATENT DOCUMENTS

| | | | | |
|---|---|---|---|---|
| 217,375 A | * | 7/1879 | Hill | 278/91 |
| 2,888,778 A | * | 6/1959 | Carter | 446/436 |
| 3,099,326 A | * | 7/1963 | Weigel et al. | 180/214 |
| 4,065,145 A | * | 12/1977 | Chambers | 280/87.021 |
| 4,558,878 A | * | 12/1985 | Motrenec | 280/272 |
| 4,611,684 A | * | 9/1986 | Geschwender | 180/223 |
| 5,160,155 A | * | 11/1992 | Barachet | 280/87.042 |
| 5,984,328 A | * | 11/1999 | Tipton | 280/87.042 |
| 6,378,642 B1 | * | 4/2002 | Sutton | 180/208 |
| 6,409,191 B1 | * | 6/2002 | Wang et al. | 280/87.041 |
| 6,491,312 B2 | * | 12/2002 | Reynolds et al. | 280/87.041 |
| 6,531,838 B2 | * | 3/2003 | Parks | 318/139 |
| 2003/0042058 A1 | * | 3/2003 | Chen | 180/180 |

FOREIGN PATENT DOCUMENTS

DE            10130795 A1 * 1/2003 ............ 280/87.021

* cited by examiner

Primary Examiner—Christopher P. Ellis
Assistant Examiner—G B Klebe
(74) Attorney, Agent, or Firm—Charles E. Baxley (57) ABSTRACT

An electrical scooter includes a chassis having front and rear ends to which front and rear wheels are mounted. A seat is mounted on the chassis for supporting a rider thereon. A steering shaft is rotatably mounted to the front end of the chassis in an upright manner and has a lower end attached to the front wheel for swiveling the front wheel. A control device is mounted to an upper end of the steering shaft. An electrical motor is mounted to one side of the front wheel and coupled to the front wheel for driving the front wheel under the control of the control device. Since the motor is mounted to one side of the front wheel, the weight of the motor induces a torque to the steering shaft and thus yawing the front wheel and making directional offset of the scooter in the moving thereof. An offset compensating device is provided to overcome the directional offset of the electrical scooter. The offset compensating device comprises a resilient element, such as a leaf spring, a torsional spring or a helical spring, arranged between the steering shaft and the chassis to apply a force to the front wheel for counteracting the weight of the motor thereby compensating the directional offset and maintaining the front wheel in a straight-forward direction.

3 Claims, 12 Drawing Sheets

DEVICE FOR COMPENSATING DIRECTIONAL OFFSET OF ELECTRICAL SCOOTER

BACKGROUND OF THE INVENTION

1. Field of the Invention

The present invention relates generally to a front drive electrical scooter, and in particular to a device for compensating directional offset caused by yawing of front wheel of the electrical scooter.

2. The Related Art

The improvement of technology and medical care extends life of human beings. The old and the disabled are best benefited from the modern technology and medical care. A lot of different supportive devices have been developed for helping the old and the disabled to transport themselves in an extended area so as to improve their living standard without particular care by other supporting medical personnel. Wheelchairs have been one of the most commonly known supportive devices for the old and the disabled to transport themselves in short distances. However, for those very weak or those having hand or arm injured, they still need other people's help in moving the wheelchairs.

Electrical wheelchairs or electrical scooters that are equipped with electrical motors allow a person to move oneself without great effort and thus are particularly suitable for those whose arms are weak or injured. The electrically powered wheelchairs and scooters are also advantageous as compared with vehicles equipped with engines powered by fossil fuels for environmental protection.

The electrical scooters can be either front drive or rear drive. In a rear drive electrical scooter, there are two rear wheels mounted to a chassis and one or more electrical motors are mechanically coupled the rear wheels for driving the chassis. The rear drive electrical scooter also has a front wheel mounted to the chassis and a steering shaft rotatably mounted to the chassis and extending from the chassis in substantially a vertical direction. The steering shaft is fixed to the front wheel for swiveling the front wheel to control the moving direction of the electrical scooter.

The rear drive electrical scooter comprises a chassis to which two rear wheels and one front wheel are mounted. An electrical motor is mounted to the front wheel for driving the front wheel. Similarly, a steering shaft is mounted, in an upright manner, to the chassis of the electrical scooter for swiveling the front wheel to change and control the moving direction of the electrical scooter. The motor is mounted to one side of the front wheel and may thus exert a torque to the front wheel and thus the steering shaft due to unbalance of weight caused by the motor. The unbalance of weight or the torque causes the front wheel to consistently yaw or swivel to one side, leading to directional offset of the electrical scooter during the movement of the electrical scooter and thus being unsafe to the scooter rider. The rider of the electrical scooter must apply a force on the steering shaft to counteract the yawing caused by the weight of the motor and compensate the directional offset. In addition, directional offset of the scooter may damage the parts thereof by wearing parts out in a short period and thus shortening the service life thereof.

Figure 9:
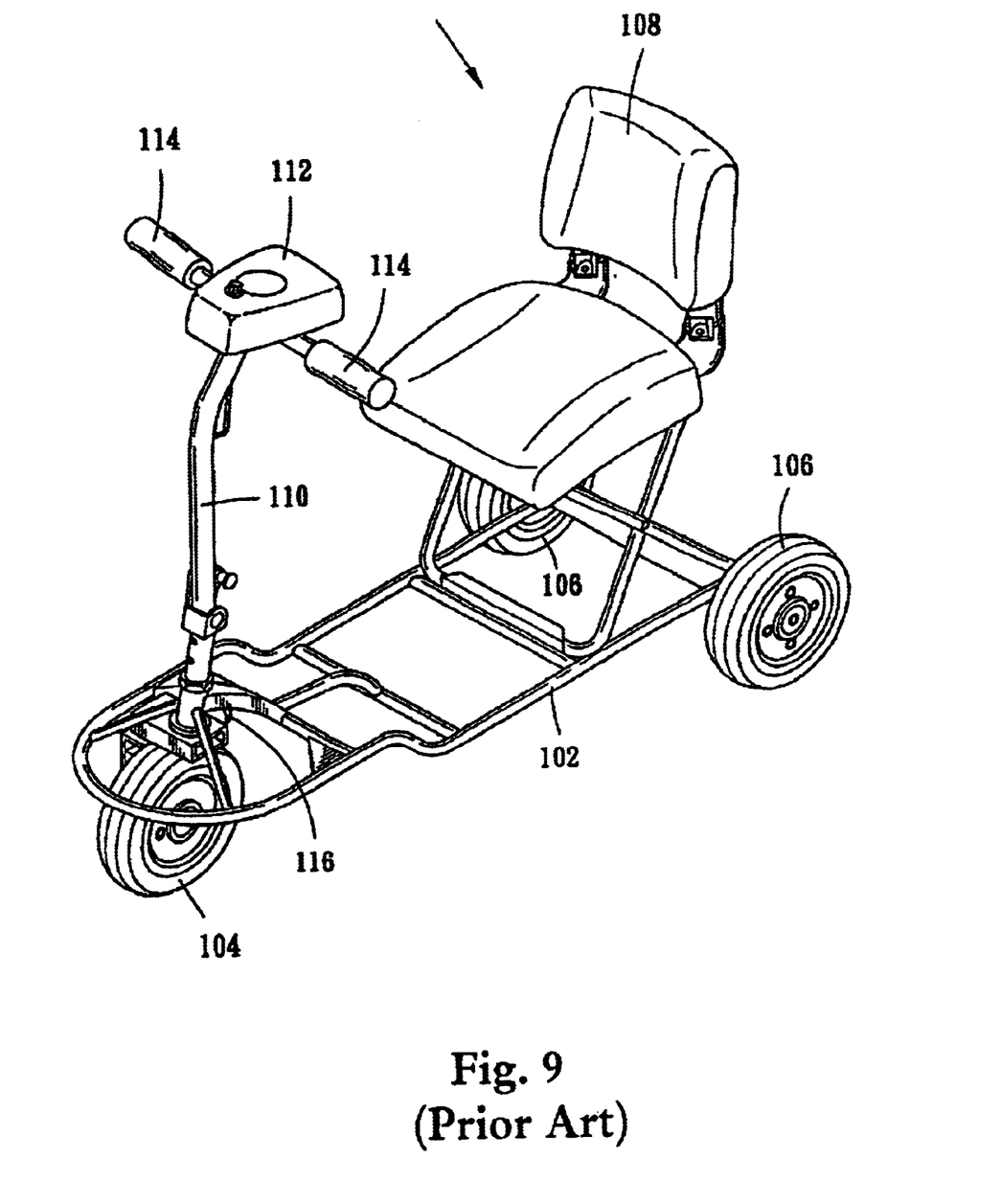
FIG. 9 is a perspective view of a conventional electrical scooter.
Figure 10:
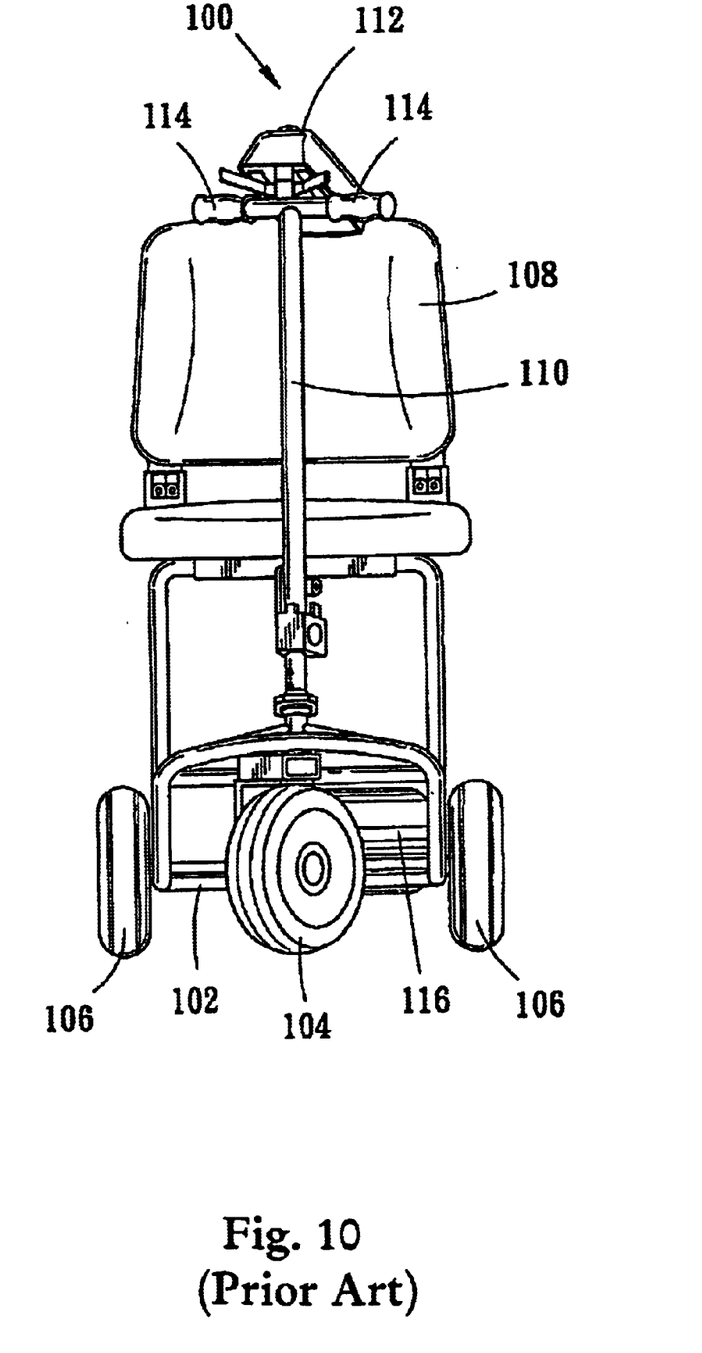
FIG. 10 is a front view of the conventional electrical scooter showing the rightward yawing of the front wheel.
Figure 11:
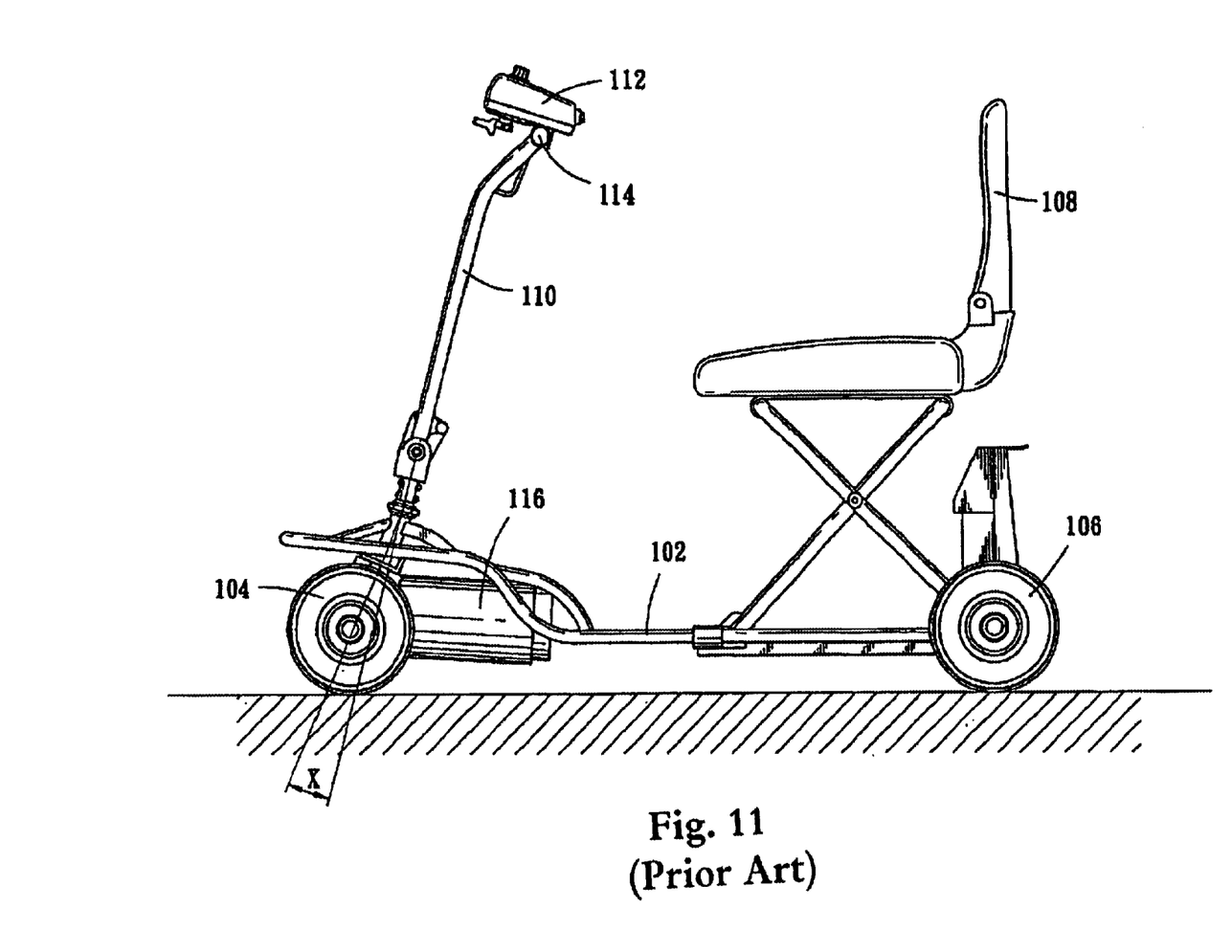
FIG. 11 is a side elevational view of the conventional electrical scooter.

FIGS. 9–11 of the attached drawings show a conventional front drive electrical scooter, which is broadly designated with reference numeral 100 throughout the drawings. The electrical scooter 100 comprises a chassis 102 having front and rear ends (not labeled) to which a front wheel 104 and two rear wheels 106 are respectively and rotatably mounted. A seat 108 is mounted on the chassis 102 in the proximity of the rear end of the chassis 102. A steering shaft 110 is mounted to the front end of the chassis 102 in a substantially upright manner. The steering shaft 110 has an upper end to which a control device 112 is mounted. Two handles 114 are mounted to the steering shaft 110 and extend in opposite directions from opposite sides of the steering shaft 110.

Figure 12:
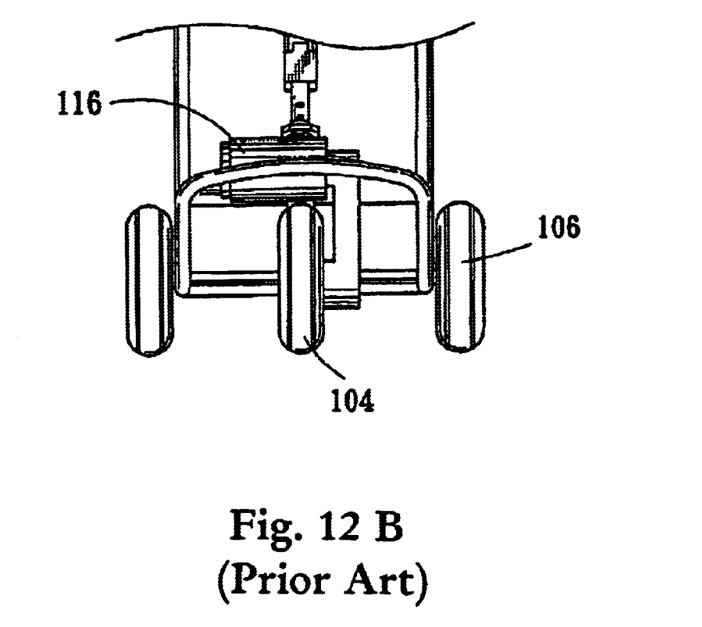
FIG. 12A is a front view of another conventional electrical scooter.
FIG. 12B is a front view of a further conventional electrical scooter.
Figure 12A:
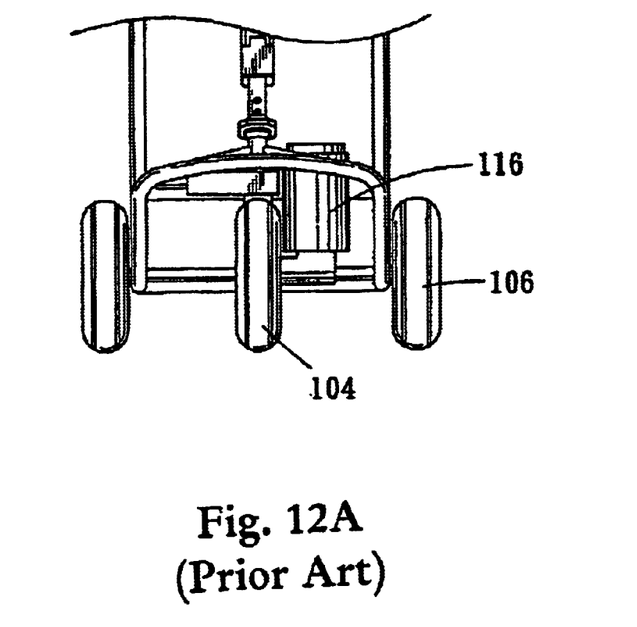

The electrical scooter 100 further comprises an electrical motor 116 that is controlled by the control device 112. The motor 116 is mounted to one side of the front wheel 104 and is mechanically coupled to the front wheel 104 for driving the front wheel 104. In the conventional electrical scooter 100 shown in the drawings, the motor 116 is located on the right side of the front wheel 104. However, it is obvious to those having ordinary skills in the art the arrange the motor 116 on the left side of the front wheel 104, as illustrated in FIG. 12A of the attached drawings, or to have the motor 116 partially above the front wheel 104 as illustrated in FIG. 12B.

To make the front wheel 104 move in the straightforward direction, the front wheel 104 is angularly offset from the steering shaft 110 by an angle X in the frontward direction, as best seen in FIG. 11. Due to the angle, the weight of the motor 116 that is mounted to the right side of the front wheel 104 induces a torque on the steering shaft 110, causing the front wheel 104 to yaw rightward as shown in FIG. 10 that in turn leads to directional offset of the scooter in the moving of the scooter. As mentioned above, the directional offset makes the electrical scooter 100 to consistently move rightward unless the yawing is compensated by a counterforce applied to the steering shaft 110 by the rider. Such directional offset also causes wearing and other undesired damage to the parts of the electrical scooter 100, shortening the service life thereof.

It is thus desired to provide an offset compensating device for electrical scooter to overcome the above problems.

SUMMARY OF THE INVENTION

Accordingly, an object of the present invention is to provide a device for maintaining the front wheel of a front drive electrical scooter in a straightforward direction by eliminating directional offset caused by weight unbalance.

Another object of the present invention is to provide a device for eliminating yawing of front wheel of a front drive electrical scooter in order to extend service life thereof.

A further object of the present invention is to provide a front drive electrical scooter having enhanced operation safety.

To achieve the above objects, in accordance with the present invention, there is provided an electrical scooter comprising a chassis having front and rear ends to which front and rear wheels are mounted. A seat is mounted on the chassis for supporting a rider thereon. A steering shaft is rotatably mounted to the front end of the chassis in an upright manner and has a lower end attached to the front wheel for swiveling the front wheel. A control device is mounted to an upper end of the steering shaft. An electrical motor is mounted to one side of the front wheel and coupled to the front wheel for driving the front wheel under the control of the control device. Since the motor is mounted to one side of the front wheel, the weight of the motor induces a torque to the steering shaft and thus yawing the front wheel and making directional offset of the scooter in the moving thereof. An offset compensating device is provided to overcome the directional offset of the electrical scooter. The offset compensating device comprises a resilient element, such as a leaf spring, a torsional spring or a helical spring, arranged between the steering shaft and the chassis to apply a force to the front wheel for counteracting the weight of the motor thereby compensating the directional offset and maintaining the front wheel in a straightforward direction.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
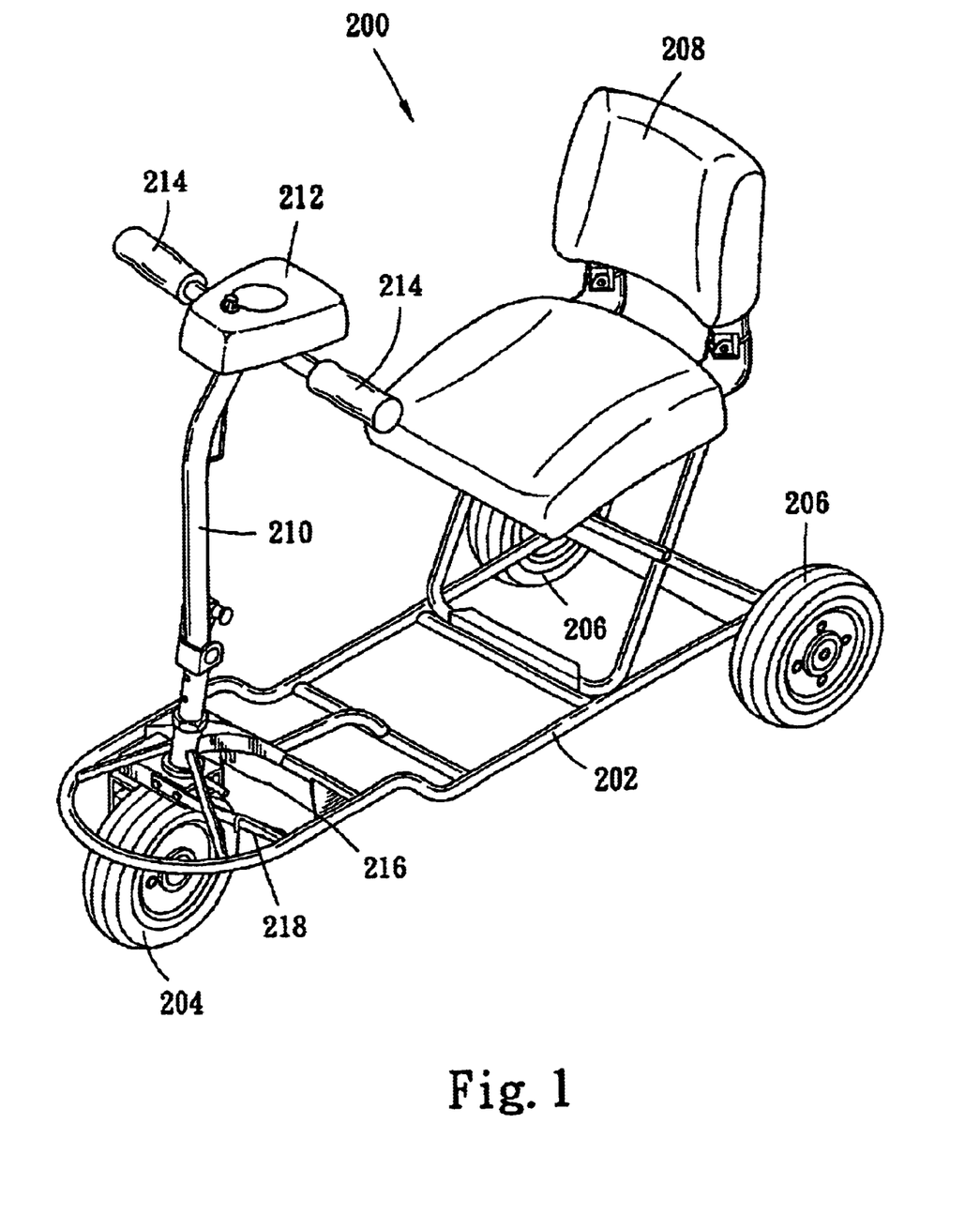
FIG. 1 is a perspective view of an electrical scooter in which an offset compensating device constructed in accordance with a first embodiment of the present invention is embodied.
Figure 2:
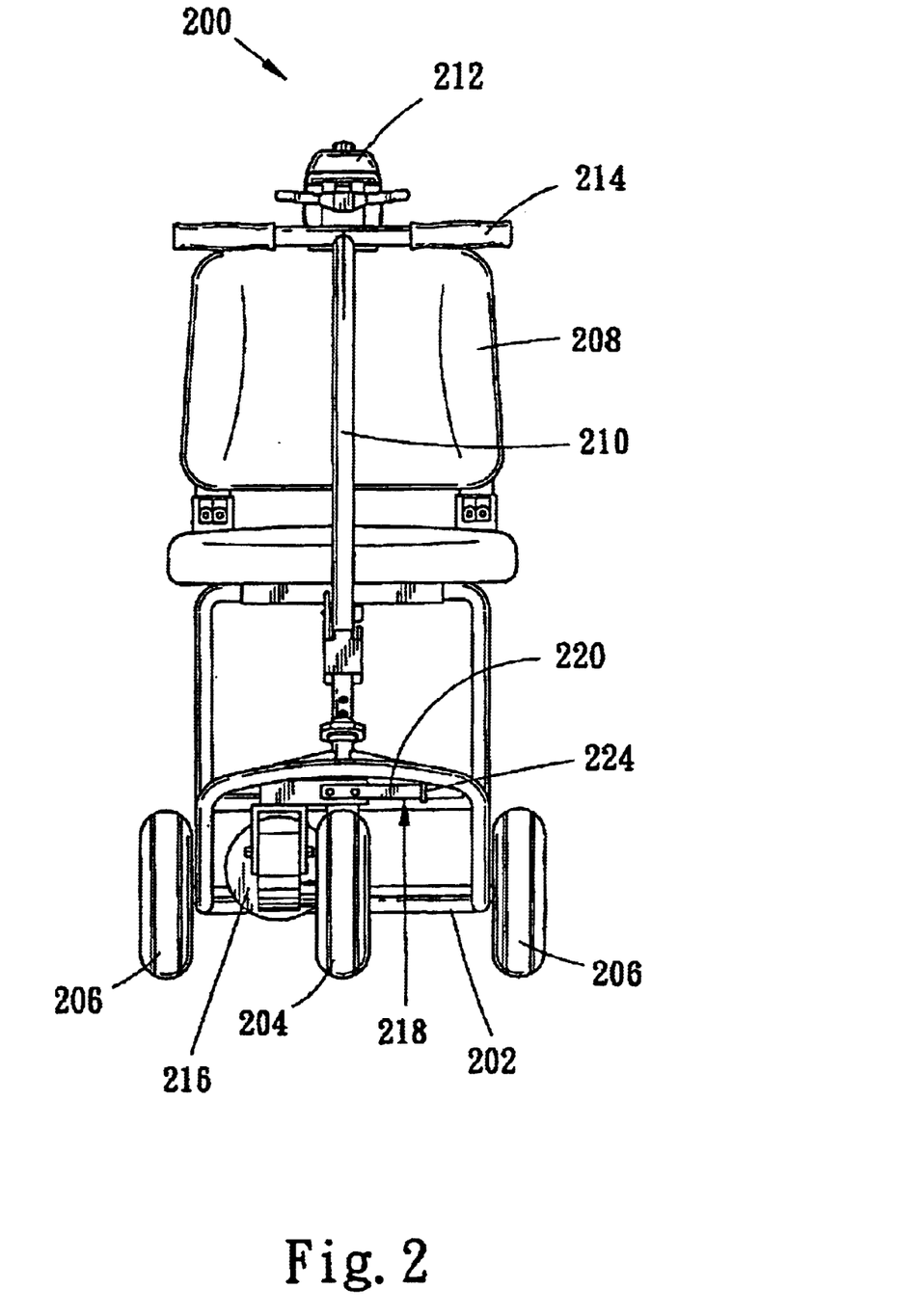
FIG. 2 is a front view of the electrical scooter of the first embodiment of the present invention.
Figure 3:
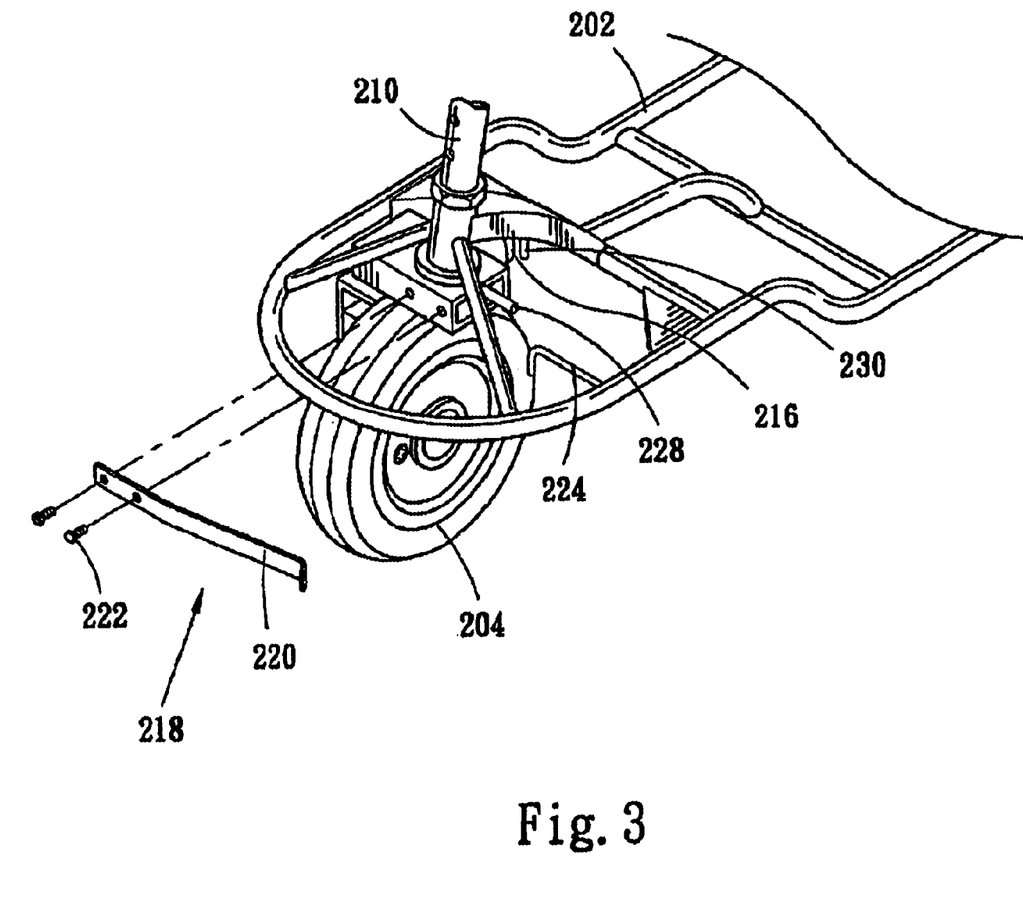
FIG. 3 is a perspective view of a front portion of the electrical scooter in which the offset compensating device is detached from a chassis of the electrical scooter.

With reference to the drawings and in particular to FIGS. 1–3, an electrical scooter, generally designated with reference numeral 100, comprises a chassis 202 having front and rear ends (not labeled) to which a front wheel 204 and two rear wheels 206 are respectively mounted. A seat 208 is mounted on the chassis 202 in the proximity of the rear end of the chassis 202. A steering shaft 210 is rotatably mounted to the front end of the chassis 102 in a substantially upright manner and is allowed to freely rotate with respect to the chassis 202. The steering shaft 210 has a lower end to which the front wheel 204 is mounted. A control device 212 is mounted to an opposite upper end of the steering shaft 210. Two handles 214 are mounted to the upper end of the steering shaft 210 and extend in opposite directions from opposite sides of the steering shaft 210.

The electrical scooter 200 further comprises an electrical motor 216 that is controlled by the control device 212. The motor 216 is mounted to right side of the front wheel 204 and is mechanically coupled to the front wheel 204 for driving the front wheel 204.

Mounting the motor 216 to the right side of the front wheel 204 leads to unbalance of weight on opposite sides of the front wheel 204, which in turn induces a torque on the steering shaft 210, causing rightward yawing of the front wheel 204 and thus directional offset of the electrical scooter 200. In order to eliminate the yawing of the front wheel 204 and the directional offset of the scooter 200, in accordance with the present invention, an offset compensating device, generally designated with reference numeral 218, is embodied in the electrical scooter 200. The offset compensating device 218 comprises a resilient element 220 which in the embodiment illustrated in FIGS. 1–3 comprises a flat leaf spring having a first end (not labeled) secured to the steering shaft 210 by fasteners 222, such as bolts, and a second free end which is allowed to freely swing with the swiveling of the front wheel 204.

A projection 224 is formed on the chassis 202, corresponding in position to the free end of the resilient element 220 whereby the free end of the resilient element 220 engages the projection 224 when the front wheel 204 aligns with a straightforward direction as shown in FIGS. 1 and 2. The resilient element 220 has a spring constant that is sufficient to apply a biasing force to the steering shaft 210 and the front wheel 204 to maintain the straightforward direction of the front wheel 204 when the front wheel 204 and the steering shaft 210 are not subject to external force and torque. In other words, the spring force or biasing force of the resilient element 220 is sufficient to counteract the torque caused by the unbalanced weight induced by the motor 216. The resilient element 220 of the offset compensating device 218 counteracts the unbalanced weight of the motor 216 and help maintaining the front wheel 204 substantially in the straightforward direction and enhancing operation stability of the steering shaft 210 thereby improving operation safety of the electrical scooter 200 and alleviating parts wearing caused by the unbalanced weight.

Figure 4:
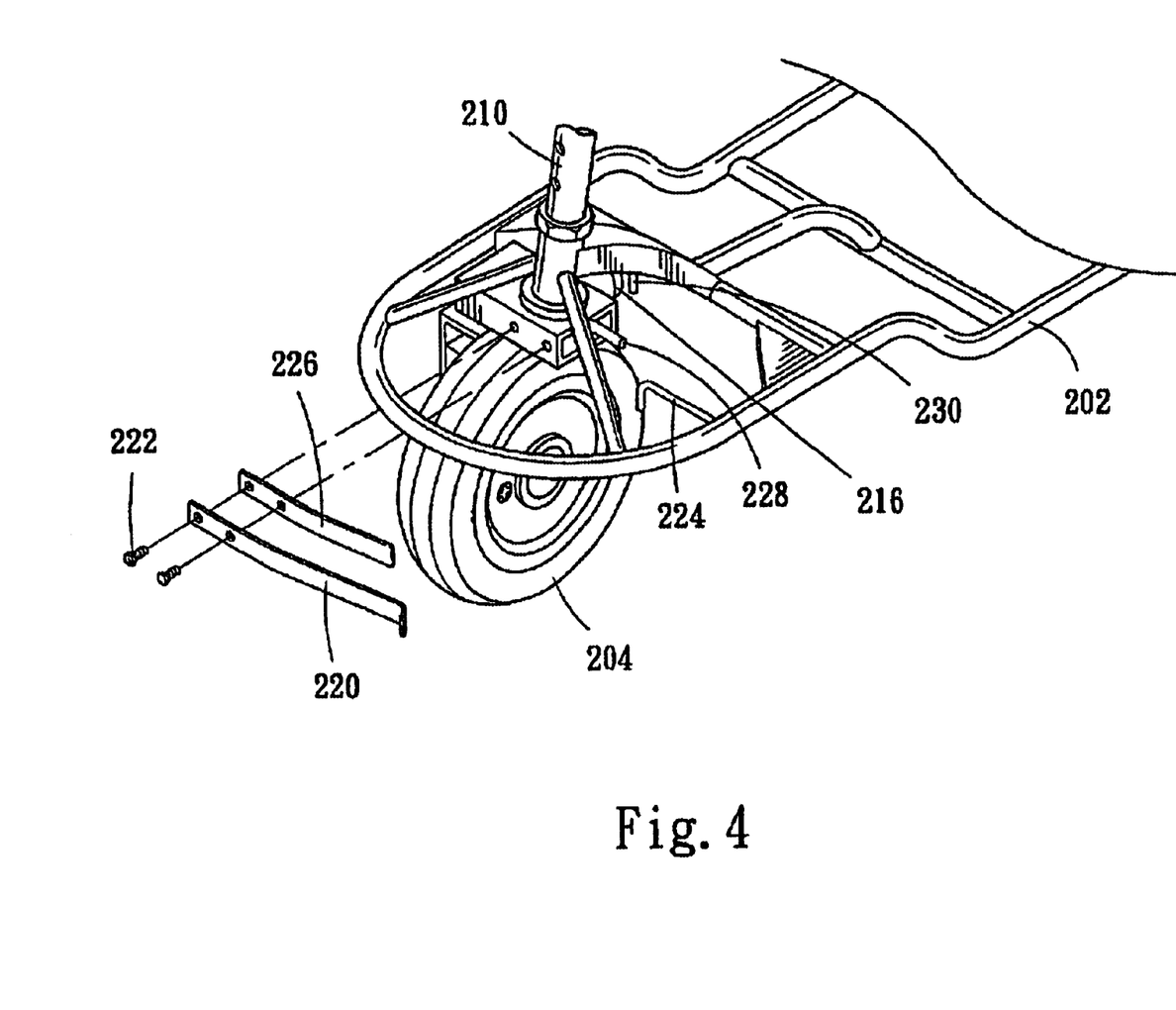
FIG. 4 is similar to FIG. 3 but showing an offset compensating device constructed in accordance with a second embodiment of the present invention.

The spring constant of the resilient element 220 can be adjusted by adding at least one extra spring plate 226 thereto as illustrated in a second embodiment shown in FIG. 4.

Figure 5:
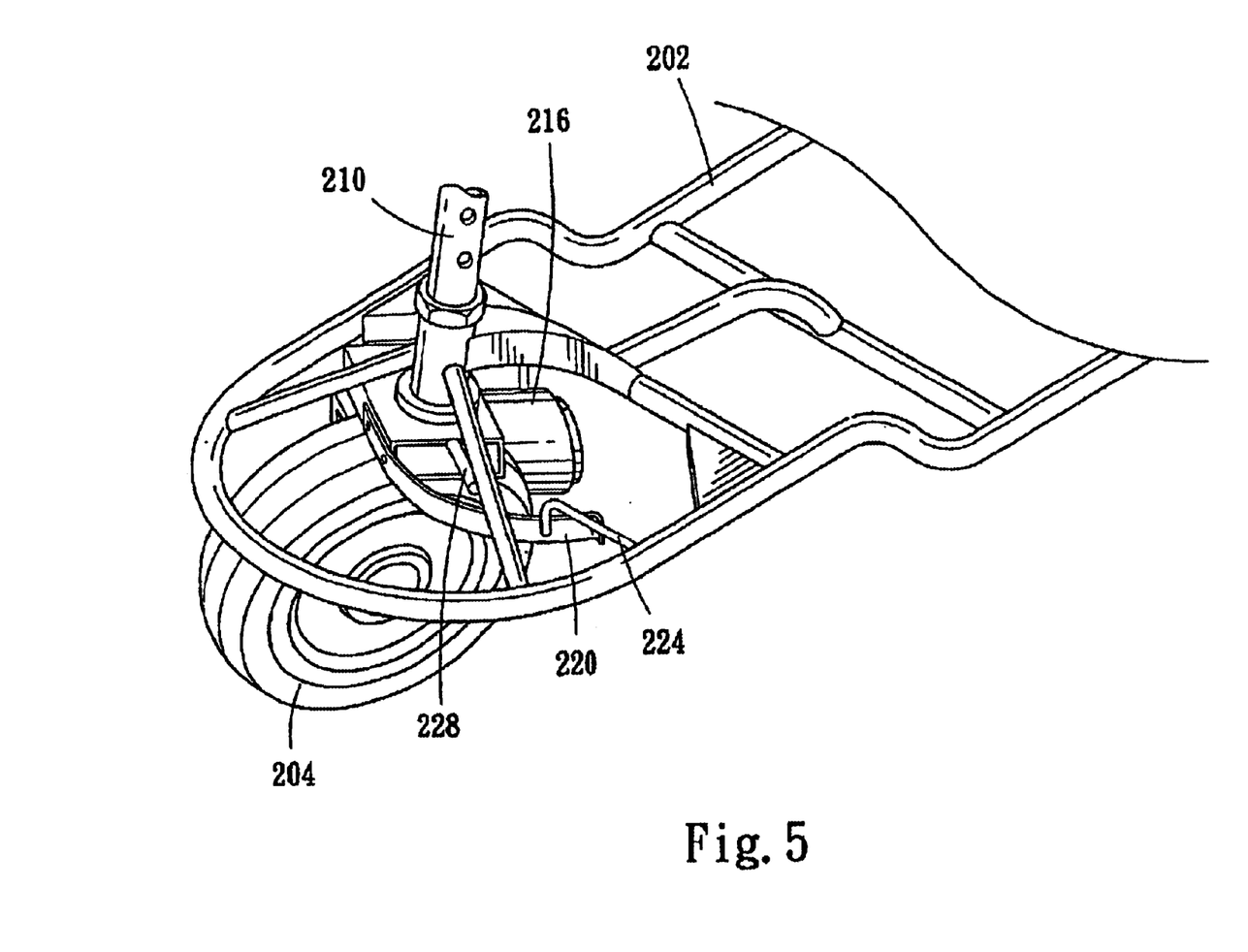
FIG. 5 is a perspective view of the front portion of the electrical scooter of the present invention showing the front wheel of the electrical scooter is swiveled rightward in making right turn of the electrical scooter.

Also referring to FIG. 5, in doing right turn of the electrical scooter 200, the rider uses the handles 214 to rotate the steering shaft 210 which in turn swivels the front wheel 204 rightward. Under this condition, the resilient element 220 undergoes elastic deformation. To overcome the biasing force of the resilient element 220 caused by the elastic deformation, the rider must apply a substantial amount of force in making right turn of the electrical scooter 200.

Figure 6:
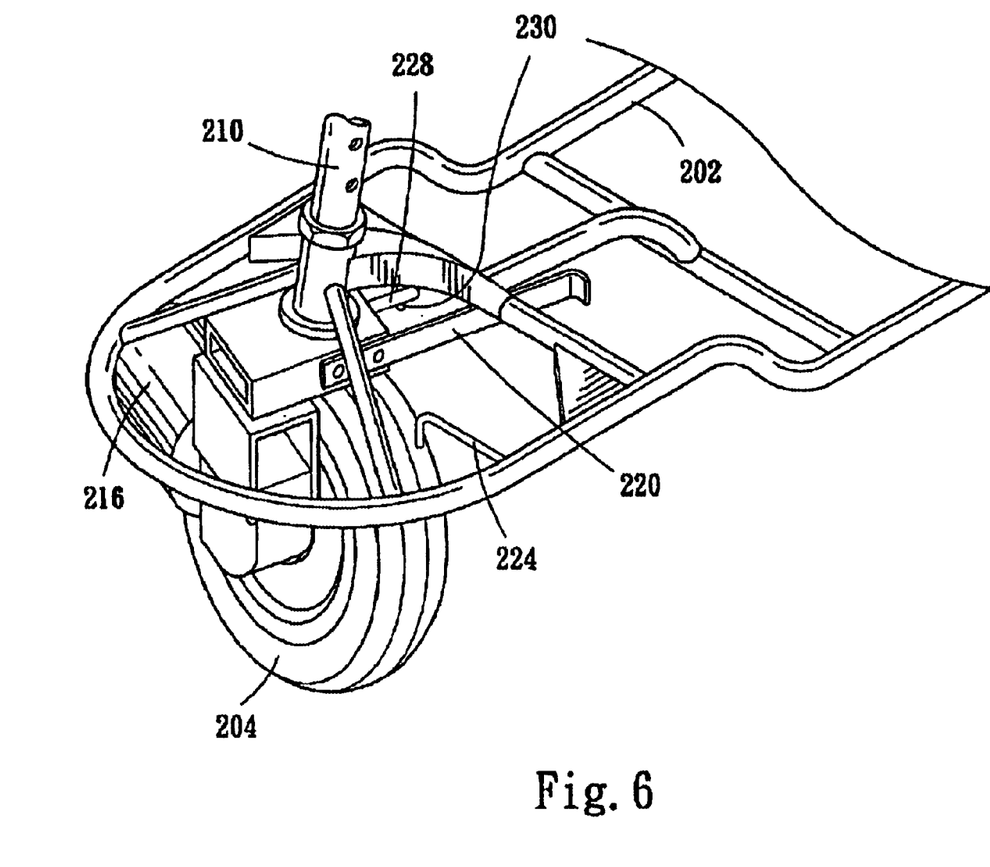
FIG. 6 is a perspective view of the front portion of the electrical scooter of the present invention showing the front wheel of the electrical scooter is swiveled leftward in making left turn of the electrical scooter.

Also referring to FIG. 6, in doing left turn of the electrical scooter 200, the rider simply rotates the steering shaft 210 to swivel the front wheel 202 leftward. The free end of the flat leaf spring 220 separates from projection 224 and induces no biasing force on the steering shaft 210. However, the unbalanced weight of the motor 216 induces a torque to the steering shaft 210. Thus, the rider still needs to apply a substantial amount of force in making left turn of the electrical scooter 200.

By selecting the spring constant of the resilient element 220, it is possible to make the force required to make right turn substantially equal to that for making left turn. This enhances the operation of the electrical scooter 200.

The steering shaft 210 also comprises a stop bar 228 which is sized and positioned to engage a corresponding stop bar 230 formed on the chassis 202 to limit the rotation of the steering shaft 210 with respect to the chassis 202 within a predetermined range in leftward swiveling the front wheel 204. No similar device is provided for rightward swiveling of the front wheel 204. However, the resilient element 220 that engages the projection 224 of the chassis 202 elastically deforms in rightward swiveling the front wheel 204 and a similar result of limiting the rotation of the steering shaft 210 with respect to the chassis 202 in making right turn can achieve.

Figure 7:
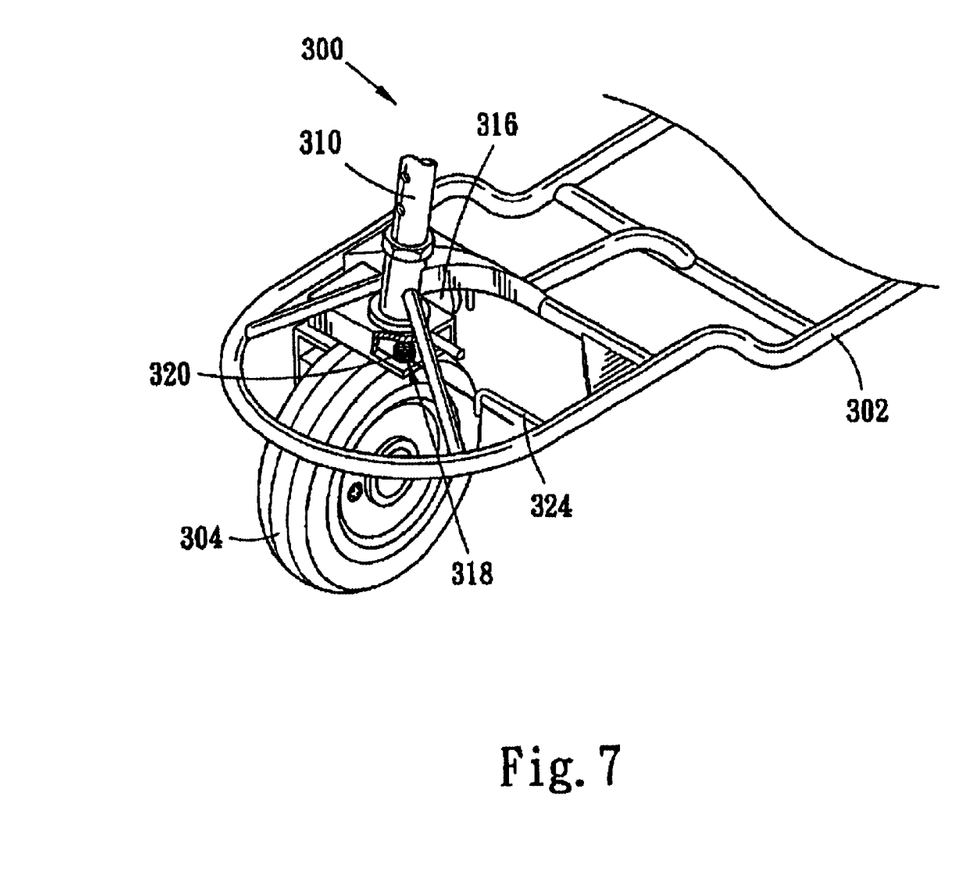
FIG. 7 is a perspective view of the front portion of the electrical scooter of the present invention showing an offset compensating device constructed in accordance with a third embodiment of the present invention.

FIG. 7 shows an electrical scooter, generally designated with reference numeral 300, incorporating an offset compensating device in accordance with a third embodiment of the present invention. For simplification, only a front portion of the electrical scooter 300 is shown, comprising a chassis 302 to which a front wheel 304 is mounted. A steering shaft 310 is arranged substantially in an upright manner and is mounted to the front wheel 304. An electrical motor 316 is mounted to the right side of the front wheel 304 and is mechanically coupled to the front wheel 304 for driving the front wheel 304. The offset compensating device of the third embodiment, generally designated with reference numeral 318, is mounted to the front wheel 304 for eliminating undesired yawing of the front wheel 304. The offset compensating device 318 comprises a resilient element 320 which is embodied in the form of a torsional spring having a first end attached to the steering shaft 310 and an opposite, second free end capable of free swinging with the rotation of the steering shaft 310.

A projection 324 is formed on the chassis 302, corresponding in position to the free end of the resilient element 320 whereby the free end of the resilient element 320 engages the projection 324 when the front wheel 304 aligns with the straightforward direction. The resilient element 320 has a spring constant that is sufficient to apply a biasing force to the steering shaft 310 and the front wheel 304 to counteract the weight of the motor 316 thereby eliminating the yawing of the front wheel 304 and compensating the directional offset of the scooter 300.

Figure 8:
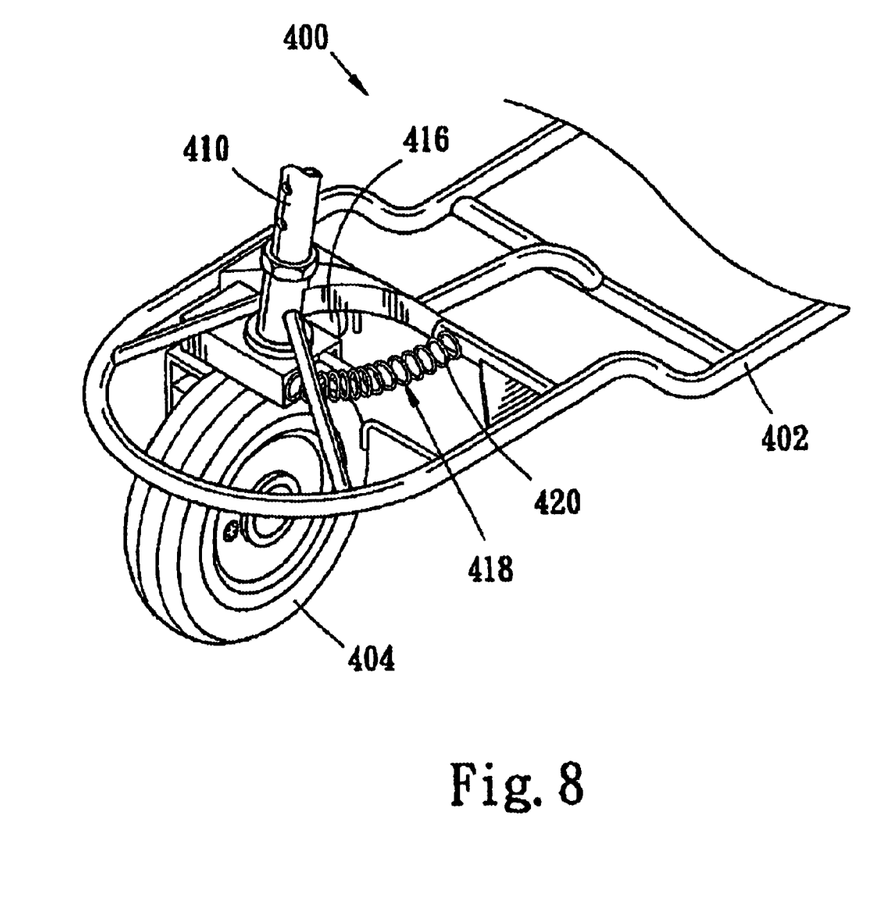
FIG. 8 is similar to FIG. 7 but showing an offset compensating device constructed in accordance with a fourth embodiment of the present invention.

FIG. 8 shows an electrical scooter, generally designated with reference numeral 400, incorporating an offset compensating device in accordance with a fourth embodiment of the present invention. For simplification, only a front portion of the electrical scooter 400 is shown, comprising a chassis 402 to which a front wheel 404 is mounted. A steering shaft 410 is arranged substantially in an upright manner and is mounted to the front wheel 404. An electrical motor 416 is mounted to the right side of the front wheel 404 and is mechanically coupled to the front wheel 404 for driving the front wheel 404. The offset compensating device of the fourth embodiment, generally designated with reference numeral 418, is mounted to the front wheel 404 for eliminating undesired yawing of the front wheel 404 and compensating directional offset of the scooter 400. The offset compensating device 418 comprises a resilient element 420 which is embodied in the form of a helical spring having a first end attached to the steering shaft 410 and an opposite second end attached to the chassis 402.

The helical spring 420 has a spring constant that applies a biasing force to the steering shaft 410 to counteract the weight of the motor 416 whereby the front wheel 402 is maintained in the straightforward direction with no yawing caused by the motor 416.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electrical scooter comprising:

a chassis having front and rear ends to which front and rear wheels are mounted;

a steering shaft arranged in the front end of the chassis in an upright manner for free rotation and being fixed to the front wheel for swiveling the front wheel by means of the rotation thereof;

a motor coupled to the front wheel for driving the front wheel, the motor being mounted to one side of the front wheel and having a weight inducing a torque to the steering shaft; and an offset compensating device comprising a resilient element arranged between the steering shaft and the chassis to apply a force to the front wheel for counteracting the torque induced by the motor thereby compensating directional offset and substantially aligning the front wheel in a straightforward direction; wherein the resilient element comprises a leaf spring having a first end attached to the steering shaft and a second free end, a projection being formed on the chassis to engage with the free end of the leaf spring.

2. The electrical scooter as claimed in claim 1 further comprising a first stop bar mounted to the steering shaft and a second stop bar mounted to the chassis whereby the first and second stop bars are engageable with each other to limit the rotation of the steering shaft within a predetermined range.

3. An electrical scooter comprising:

a chassis having front and rear ends to which front and rear wheels are mounted;

a steering shaft arranged in the front end of the chassis in an upright manner for free rotation and being fixed to the front wheel for swiveling the front wheel by means of the rotation thereof;

a motor coupled to the front wheel for driving the front wheel, the motor being mounted to one side of the front wheel and having a weight inducing a torque to the steering shaft; and an offset compensating device comprising a resilient element arranged between the steering shaft and the chassis to apply a force to the front wheel for counteracting the torque induced by the motor thereby compensating directional offset and substantially aligning the front wheel in a straightforward direction; wherein the resilient element comprises a leaf spring having a first end attached to the steering shaft and a second free end, a projection being formed on the chassis to engage with the free end of the leaf spring, and wherein a first stop bar is mounted on the steering shaft and a second stop bar is mounted on the chassis, the first and second stop bars engaging each other to limit rotation of the steering shaft to a predetermined range.

* * * * *